United States Patent [19]

Sperber

[11] 4,111,493
[45] Sep. 5, 1978

[54] FEEDING APPARATUS FOR A PNEUMATIC CONVEYING SYSTEM

[76] Inventor: Henry Sperber, 8 Red Fox La., Englewood, Colo. 80110

[21] Appl. No.: 778,131

[22] Filed: Mar. 16, 1977

[51] Int. Cl.² ............................................. B65G 53/40
[52] U.S. Cl. ..................................... 302/42; 198/532; 222/194; 222/227; 302/2 A; 302/49; 302/56
[58] Field of Search ...................... 302/2 A, 36, 49, 56, 302/42; 222/194, 236, 238, 311, 317, 332, 459, 227; 198/530, 532, 533

[56] References Cited

U.S. PATENT DOCUMENTS

| 1,799,928 | 4/1931 | Phifer | 222/317 |
| 2,183,583 | 12/1939 | Patterson | 302/36 X |
| 2,355,358 | 8/1944 | Anderson | 302/36 X |
| 2,446,752 | 8/1948 | Fiddyment | 198/533 |
| 2,597,323 | 5/1952 | Hiller et al. | 222/238 X |
| 2,858,212 | 10/1958 | Durant et al. | 302/49 X |
| 2,886,216 | 5/1959 | Öholm | 222/332 X |
| 3,009,744 | 11/1961 | Lenhart | 302/49 |
| 3,145,882 | 8/1964 | Quackenbush | 222/238 X |
| 3,529,870 | 9/1970 | Woten | 302/36 X |
| 4,044,921 | 8/1977 | Caverly | 222/238 X |

FOREIGN PATENT DOCUMENTS 2,536,444 3/1976 Fed. Rep. of Germany ........... 198/532

Primary Examiner—Evon C. Blunk
Assistant Examiner—James L. Rowland
Attorney, Agent, or Firm—Sheridan, Ross, Fields & McIntosh

[57] ABSTRACT

A feeding apparatus for a pneumatic conveying system comprising a guide chute and a rotary pocket feeder. The guide chute includes a plurality of parallel rod members positioned across its inlet, an upper and lower rotating tine means, and an adjustable sized outlet. The upper and lower tine means are rotated in the same direction about parallel, vertically spaced axes and have tine members that extend outwardly of their respective axis to mesh with each other. The tine members of the upper tine means also mesh with the rod members to assist in bringing material into the chute where the material is conveyed through the variable sized outlet into the pocket feeder for delivery to the conduit of a pneumatic conveying system. The empty return portion of the pocket feeder is vented into the upper portion of the chute to prevent any pressure remaining in the pocket feeder from blowing back into the chute outlet. The feeding apparatus is particularly suited to handle fibrous insulating material and other materials with a fluffy consistency.

9 Claims, 5 Drawing Figures

FEEDING APPARATUS FOR A PNEUMATIC CONVEYING SYSTEM

BACKGROUND OF THE INVENTION

The present invention is directed to a pneumatic conveyor which is capable of transporting fibrous insulating material. It is more specifically directed to a guide chute arrangement for dispensing insulating material from a storage hopper to a rotary pocket feeder for a pneumatic conveying system.

The economic benefits of a well-insulated home or building have long been appreciated in regions of the country with very cold winters or very hot summers and are beginning to be appreciated in areas with milder temperatures.

Fiberglass, rock wool, and cellulose are popular insulating materials. These fibrous materials can be placed in the walls, floors and ceilings of a building in the form of thick mats or they can be pneumatically blown or sprayed into the desired location. Many areas of a new or existing building do not lend themselves to the installation of mats, and pneumatic systems must be used to deliver the insulation.

Pneumatic systems have been widely and successfully employed to convey particulate material such as grain or flour. Typically, the particulate material is fed from a hopper into a rotary pocket feeder. The pocket feeder serves as an air lock and delivers the material to a conduit under pressure for conveyance to the desired location. Such pneumatic systems work well with particulate material but have produced less than satisfactory results when handling insulating material such as fiberglass, rock wool and cellulose. These insulating materials present special problems to pneumatic systems because they have long, light fibers and a relatively fluffy consistency that must be maintained.

The use of such fibrous materials and other light, fluffy insulating materials, such as treated paper, in existing pneumatic systems has resulted in back pressures in the chute, irregular feeding, line pulses, and the destruction of the fluffy nature of the material. This destruction greatly diminishes the insulating properties of the material. The agitators in the hopper are a particular problem in this regard. In past systems, the agitators were designed to direct particulate material downwardly and to prevent bridging above the pocket feeder. When handling fibrous insulating materials, these agitators have a tendency to grind up the materials and destroy their fluffy consistency.

Because of the above stated problems with the prior art, it is an object of this invention to provide a feeding apparatus for a pneumatic system which is particularly adapted to handle fibrous materials without destroying the fluffy consistency of those materials.

It is also an object of this invention to provide a feeding apparatus for a pneumatic system that adjustably controls the feeding rate of material into the system.

Another object is to provide a feeding apparatus for a pneumatic system that prevents back pressures from disrupting the feeding rate of the apparatus.

It is also an object to provide a feeding apparatus for a pneumatic system that uniformly feeds material into the system to prevent pulses and surges at the delivery end of the system.

A further object is to provide an apparatus with an improved manner of controlling the flow rate of material into, through and out of a guide chute. The apparatus is particularly adapted to handle fibrous materials.

SUMMARY OF THE INVENTION

This invention is directed to an improvement in the conveying of long fiber type insulating materials in a pneumatic conveying system. A guide chute arrangement is provided at the outlet of a storage hopper with the outlet of the chute connected directly to the inlet of a rotary pocket feeder. A pneumatic conduit is positioned in conjunction with one of the portions of the pocket feeder so that a gas such as air can be blown in one end of the feeder so that it picks up the fibrous material and carries this material with the air through the pneumatic conduit provided at the opposite end of the feeder.

A suitable power drive arrangement is provided with the machine for driving an air compressor. The compressor pressurizes large quantities of air which are fed through the pocket feeder so that the insulation material is carried to its destination. A by-pass valve is provided on the outlet of the compressor to by-pass air to the atmosphere in order to control the amount of air and pressure that is fed through the pocket feeder for conveying the material.

The insulation material is placed in the storage hopper where a rotating conveyor moves the material towards the inlet to the chute. A plurality of parallel rods are positioned in the outlet of the hopper to retain the material in the hopper and regulate the amount of material entering the chute. These rods are inclined in a downward direction from the horizontal so that gravity will retain the rods in their proper guide holes.

Two rotating members having parallel and vertically spaced shafts and including outwardly extending tines or fingers are rotatably mounted in the guide chute. The tines on the upper rotating member intermesh between the support rods with the tines of the lower rotating member intermeshing with the tines of the upper. Both of these rotating members and the rotor of the pocket feeder which will be described later, rotate in the same direction. This permits a controlled amount of fibrous material to be drawn from the hopper through the support rods and moved downwardly through the chute to the pocket feeder. This arrangement is important from the standpoint that a controlled amount of the material is moved through the chute continuously without the material being churned and agitated causing the fibers to break up resulting in compaction and plugging which is common in other apparatus of this type.

A novel arrangement is provided for controlling the outlet size of the chute to control the amount of material that is fed to the pocket feeder. A horizontally slidable plate is positioned in the side of the chute in contact with a pivotally mounted wall section of the chute. As the plate is moved inward through the chute wall, the wall plate is caused to move towards the bottom rotating member reducing the size of the outlet or opening to the pneumatic pocket feeder. By positioning the slidable plate, the quantity of material that is dispensed through the pocket feeder and the pneumatic conveyor can be easily controlled.

The pocket feeder includes a rotor having a plurality of solid vanes which are positioned within an enclosed cylindrical case. The inlet and outlet of the pneumatic conveyor are provided in the opposite end walls of the cylindrical case so that as the rotor is turned, a specified quantity of material is carried with each section of the rotor into alignment with the pneumatic conveyor inlet and outlet openings. Air blowing through the rotor section carries the quantity of material through the pneumatic conveyor conduit to its desired destination. As the empty rotor section returns towards the chute outlet, a vent port is uncovered allowing any residual pressure remaining in that section to be vented to the outside or back into the upper portion of the guide chute area. In this way, pressure blow back into the chute outlet is eliminated.

A liquid pump which can be driven by the drive motor for the present apparatus can be provided for delivering a binding agent by a separate hose to the pneumatic conduit nozzle. The nozzle is intended to mix the binding material with the fibrous insulation material so that the insulation material will adhere to any wall or object which it touches. In this way the apparatus of the present invention can be used to apply fibrous material such as insulation either dry or wet, depending upon the application desired.

BRIEF DESCRIPTION OF THE DRAWINGS

Other objects and features of this invention will appear in the following description and appended claims, reference being made to the accompanying drawings forming a part of this specification, wherein alike reference characters designate corresponding parts or portions thereof in the different views.

DETAILED DESCRIPTION OF THE EMBODIMENTS

Figure 1:
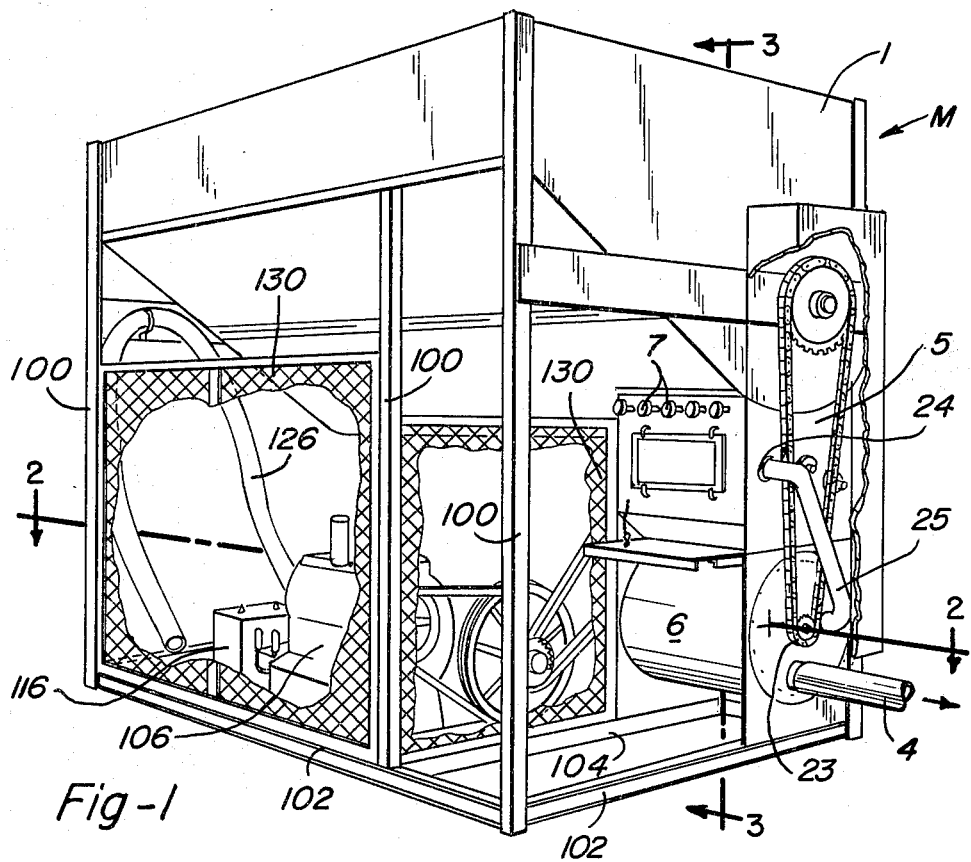
FIG. 1 is a perspective view of the feeding apparatus according to the present invention in use with a pneumatic conveying system.
Figure 2:
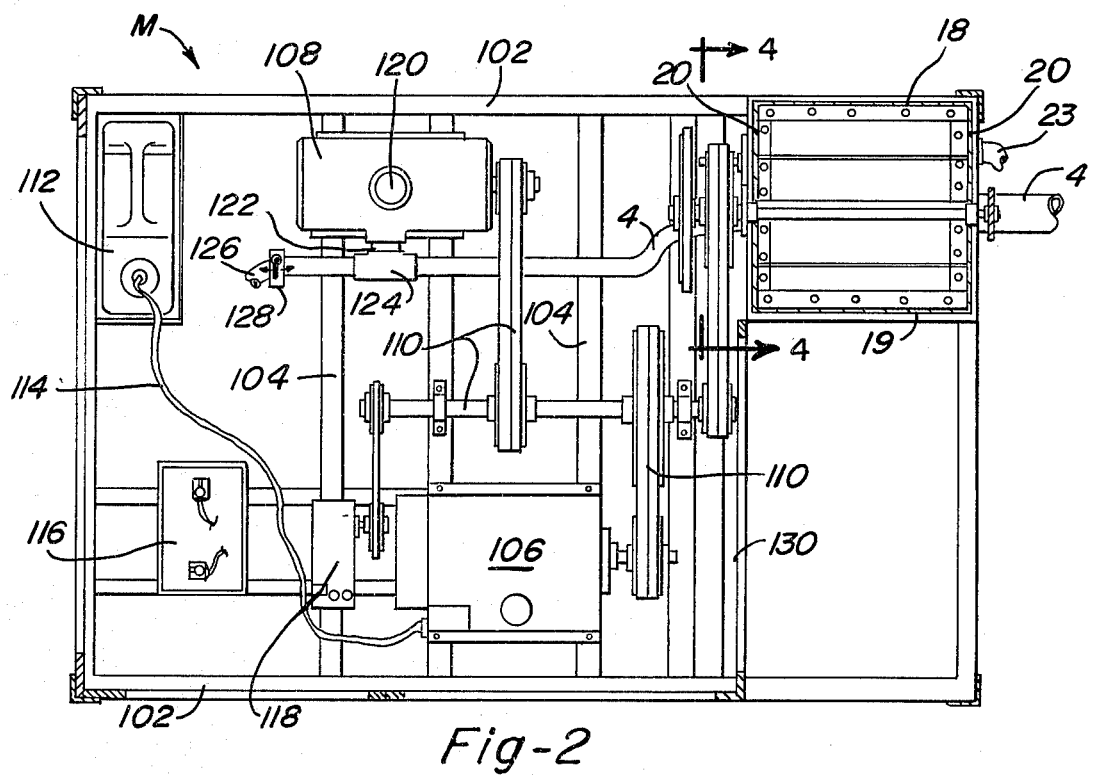
FIG. 2 is a top plan view taken along lines 2—2 of FIG. 1 and showing the top part of the pneumatic pocket feeder removed to show the vaned rotor.

FIGS. 1 and 2 show a fibrous material conveying machine M according to the present invention. The machine M includes a large storage hopper 1 having an open top into which the fibrous material is deposited. The hopper 1 is supported on a plurality of suitable column members 100 fixedly attached in an upright position to the base frame 102. Suitably mounted on cross members 104 are the power drive device 106 and the air compressor 108. A shaft and pulley drive assembly 110 is suitably arranged in position on the cross members 104 to drive the compressor and feed assembly from the drive device 106.

The drive assembly 106 can be a gasoline powered internal combustion engine interconnected with the fuel tank 112 by the fuel line 114. An electric storage battery 116 is provided for conveniently starting the engine when desired. The engine provided in the present embodiment is capable of developing 20 horsepower under load requirements. It is to be understood that any type of power drive assembly such as an electric motor could be substituted for the gasoline engine when desired.

A liquid pump 118 for delivering a liquid binding agent through suitable hose (not shown) to the nozzle of the pneumatic conveyor conduit can be provided as desired to provide both a dry or wet application capability.

The air compressor 108 has an inlet 120 which includes a suitable type filter for filtering the air entering the system. The compressed air outlet 122 is connected to a tee 124 which is connected by the pneumatic conduit 4 to the pneumatic pocket feeder 6. The opposite end of the tee 124 is connected to a tube 126 which contains a manually operated valve 128. The valve 128 is provided as a by-pass for controlling the quantity and pressure of air delivered through the pocket feeder for conveying the fibrous insulation material.

The sides of the machine M are suitably enclosed with solid panels with openings provided therein for the positioning of mat type air filters 130 provided in the sides to allow passage of air to the interior of the machine as required without the introduction of fibrous particles.

Figure 3:
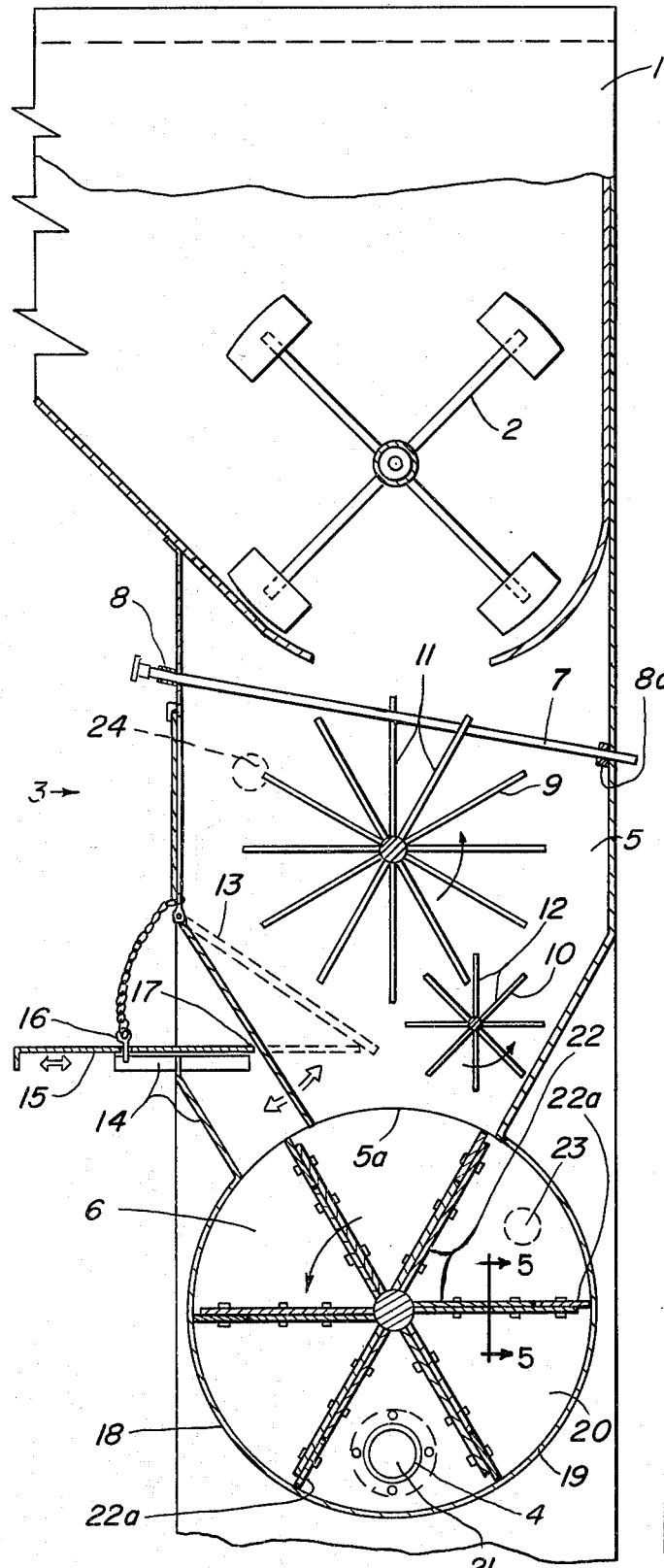
FIG. 3 is a partial cross-sectional side view taken along lines 3—3 of FIG. 1, showing the various elements of the feeding apparatus, the placement of the vent pipe openings in the side of the pocket feeder and guide chute are illustrated in this view to show their general location.
Figure 5:
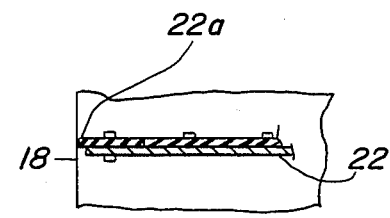
FIG. 5 is a partial cross-sectional side view taken along the lines 5—5 of FIG. 3, showing the arrangement of a sealing edge of a rotor vane for the pocket feeder, the seal is in contact with the surface of the pocket feeder housing to prevent loss of pneumatic pressure from the rotor section.

The feeding apparatus for the pneumatic conveying machine which is of major importance in the present invention is best seen in FIGS. 1 and 3. Material in the hopper 1 is delivered by the rotating conveyor 2 to a position above the pneumatic conveyor feeding apparatus 3 to be fed downwardly thereby into the pneumatic conduit 4 of the conveying system. The feeding apparatus 3 includes the guide chute 5 and the rotary pocket feeder 6.

Chute 5 has a plurality of rod members 7 supported across the upper opening of the chute 5 in opposing pairs of holes in the chute walls. Guide members 8, 8a are tubular with inwardly inclined openings to assist in directing a rod member 7 into a hole. These guide members 8 can be positioned adjacent one hole of a pair or adjacent each hole if necessary. The rod members 7 can be supported in operating positions that are horizontal or slightly inclined to the horizontal. The inclined operating position is preferred because the force of gravity will then help to maintain the rod members 7 in their positions. The supporting holes of each pair are spaced apart in different horizontal planes and the holes in opposing walls of the chute are aligned so that the rod members 7 are supported in parallel operating positions. The rod members 7 serve to regulate and restrict the flow of material in the chute 5, and the number of rod members 7 positioned across the opening in the chute can be varied as desired.

The chute 5 also has upper and lower rotatable tine means 9 and 10 mounted for rotation about substantially parallel axes. These axes or shafts are substantially perpendicular to the operating positions of the rod members 7. The upper tine means 9 has tine or finger members 11 spaced along the shaft thereof in an offsetting relationship to the operating positions of the rod member 7 and extending outwardly so that the tine members 11 mesh with the rod members 7 in their operating positions as shown in FIG. 3. The axis or shaft of the lower tine means 10 is vertically spaced from the shaft of the upper tine means 9. The axes of the tine means 9 and 10 can be spaced directly above each other, but in one embodiment, are in different vertical planes. The lower tine means 10 has outwardly extending tine or finger members 12 spaced along the shaft thereof in an offsetting relationship to the tines 11 of the upper tine means 9 so that the tine members 11 and 12 mesh. The outward extent of the tine members 11 from the axis of the upper tine means 9 is greater than the outward extent of the tine members 12 from the axis of the lower tine means 10.

The size of the lower opening 5a in the chute 5 is adjustable. The adjusting means includes the pivotally mounted wall member 13, the stationary support member 14, the control member 15, and the securing pin 16. The pivotal axis of the wall member 13 is substantially parallel to the axes of the upper and lower tine means 9 and 10. The control member 15 is movable to position its end portion 17 against the wall member 13 to move the wall member 13 toward the interior of the chute 5. The stationary support member 14 has at least one hole through it and the control member 15 has a series of holes through it. The wall member 13 and control member 15 can be held in any desired position by aligning the holes in the control member 15 and the support member 14 and inserting the pin 16.

The control member 15 is also movable to position its end portion 17 at a point farther from the pivotal axis of the wall member 13 than the outward extent of the wall member 13 therefrom. When this occurs as shown in phantom lines in FIG. 3, the wall member 13 rides upon the main body portion of the control member 15 and the end portion 17 becomes a portion of the chute's outlet. Between the positions shown in full and phantom lines in FIG. 3, the end portion 17 of the control member 15 first slides along the wall member 13 in a direction away from the pivotal axis until the end portion 16 is positioned at a point equal to the outward extent of the wall member 13 from its axis. Then, the wall member 13 will ride upon the main body portion of the control member 15 as its end portion 17 is moved farther way from the pivotal axis.

Pocket feeder 6 is positioned below the lower opening 5a in the chute 5. The pocket feeder 6 has a casing 18 with a substantially cylindrical main body 19 and two circular end members 20. The main body 19 has an upwardly facing opening extending logitudinally of the main body 19 to receive material from the chute 5. Each end member 20 has a passage 21 through its lower half that is operably connected to the conduit 4 of the pneumatic conveying system. The passages 21 are substantially aligned with each other. The outlet passages 21 or both of the openings 21 can be formed in a conical tapered arrangement, if desired, to improve the pick-up and flow of air and material through the pocket feeder and into the conduit 4.

Figure 4:
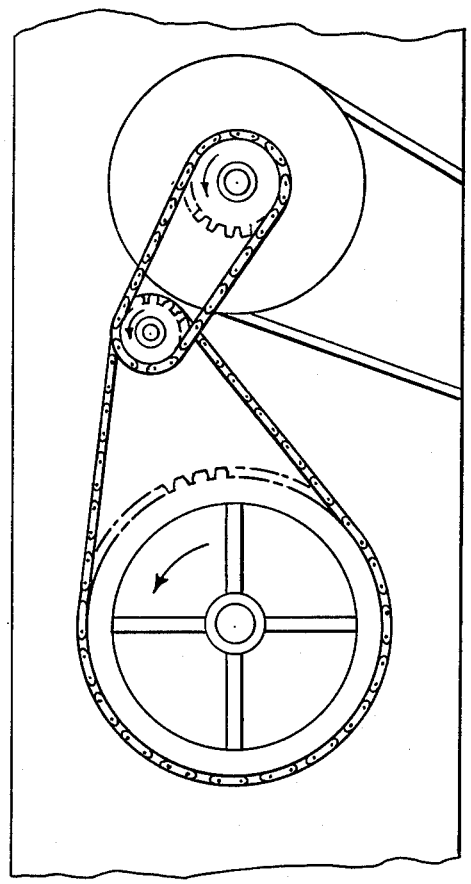
FIG. 4 is a view taken along lines 4—4 of FIG. 2, illustrating the drive arrangement whereby the upper and lower tine means and the pocket feeder are all rotated in the same direction.

The pocket feeder also has a rotor or vane means mounted in the casing 18 for rotation about an axis or shaft substantially parallel to the axes of the upper and lower tine means 9 and 10. The rotor has a plurality of vane members 22 extending outwardly of the axis and each includes an edge seal 22a in sliding contact with the casing 18. The vane members 22 are evenly spaced about the axis. In the illustrated embodiment, there are six vane members 22. The drive arrangement in FIG. 4 rotates the vane members 22 about the axis of the rotor in the same direction as the upper tine means 9. As seen in FIG. 3, each vane member 22 is moved through a cycle from a first position adjacent the opening in the main body 19, past the opening, to a second position adjacent the passages 21, and then back to its first position. The portion of the casing 18 swept by each vane member 22 as it is moved from its second position back to its first position is vented to relieve any residual pressure in the pocket feeder 6 and prevent blow backs into the lower opening in the chute 5.

The vent means includes a vent passage 23 through the casing 18 in the portion swept by each vane member 22 from its second position back to its first position, a passage 24 through the upper portion of the guide chute wall, and conduit 25 connecting the two passages. The pressure build up in the pocket feeder can be vented to any area of atmospheric pressure, but in this embodiment, is vented into the chute 5 in order to maintain a closed system. Often times, all of the material in a pocket is not delivered into the pneumatic conduit 4 and a portion remains in the pocket as it is moved into the vented area of the casing 18. Some of this remainder will be conveyed in the venting air and for economic and safety reasons, the pressure build up is preferably vented into the chute 5.

The vent passage 23 is preferably located in the forward end member 20 in the direction of the pneumatic flow but can be located anywhere in the portion of the casing 18 swept by the vane members 22 from their second position to their first position. In this embodiment, there are six vane members 22 and the opening in the main body 19 is spaced from the passages 21 in the end members 20 so that each vane member 22 sweeps through an arc of at least 120° as it is moved about the axis of the rotor from its second position back to its first. The vent passage 23 is located closer to the first position of the vane members 22 than to their second position so that for portions of a cycle, there are at least two vane members between the passages 21 and the vent passage 23. This is desirable because there is a tendency for the high pressure air entering the pocket feeder 6 through the pneumatic conduit 4 to set up a current passing through the seal 22a of the vane members 22 and out the vent means. By placing more than one vane member 22 between the passages 21 and the vent passage 23 during portions of a cycle, this undesirable current must pass through two sealing engagements for portions of each cycle rather than just one and is, therefore, reduced.

In use, the engine 106 and compressor 108 are placed in operation and air is blown through the pneumatic conduit 4. The quantity of air flow required for carrying the fibrous material is controlled by adjusting the by-pass valve 128. Fibrous material which is placed in the hopper 1 is delivered by the conveyor 2 to a position above the rod members 7 of the chute 5 to be fed through the chute 5 and pocket feeder 6 into the pneumatic conduit 4. The tine members 11 of the upper tine means 9 mesh with the rod members 7 and assist in bringing the material into the chute 5. The tine members 11 continue to move the material about the axis of the tine members 9 to a position roughly between the axes of the upper and lower tine means 9 and 10 where the tines 11 and 12 mesh. The same rotating lower tine means 10 then moves the material about its axis and out the lower opening 5a of the chute 5 into a pocket of the pocket feeder 6. The rotary pocket feeder 6 conveys the material to a position in line with the passages 21 for delivery into the conduit 4. Continued rotation of the pocket feeder 6 will align the pocket with the vent portion of the casing 18 to relieve any pressure build up therein before the pocket is again positioned under the outlet of the chute 5.

The material is conveyed along a linear path through the chute 5 and the feeding apparatus is particularly adapted to handle fibrous material and other materials which have a fluffy consistency. The number and placement of the rod members 7 across the inlet to the chute 5 can be varied as described as can the size and lateral location of the chute outlet. The rotational speeds of the pocket feeder 6 and the upper and lower tine means 9 and 10 can also be varied.

The invention has been described in detail with particular reference to an embodiment thereof, but it will be understood that variations and modifications can be effected within the spirit and scope of the invention.

What is claimed is:

1. In a pneumatic conveying system for supplying fibrous, light-weight insulating material to a desired location wherein said conveying system includes a rotary pocket feeder having a plurality of spaced vanes, a source of pneumatic pressure connected to one end of the feeder, a conveying conduit connected to the other end of the feeder for conveying insulating material from the feeder to the desired location by means of air flowing through the feeder and conduit from the pneumatic pressure source, a hopper located above the feeder for holding a supply of insulating material, and a chute interconnecting the hopper and the feeder and forming a restricted opening along the length of the top of the feeder through which the insulating material is fed into the feeder, the improvement comprising:
   first tine means rotatably mounted within the chute and having fingers of sufficient length to extend partially into the lower portion of the hopper;
   a plurality of rod members spaced across the bottom of the hopper and offset from the first tine member fingers so that said fingers can extend into the lower portion of the hopper and engage insulating material therein;
   second tine means rotatably mounted within the chute adjacent the restricted opening and between said first tine means and the pocket feeder, said second tine means having fingers which are offset from said first tine means fingers and are of sufficient length to intermesh therewith; and
   means connected to said first and second tine means to rotate them in the same direction so that said fingers of said first tine means pull insulating material from the hopper through said rod members down into the chute in the vicinity of said second tine means whereupon the fingers of said second tine means pull the insulating material off of the fingers of the first tine means within the chute and down through the restricted opening into the pocket feeder.

2. The improvement of claim 1 wherein:
   said fingers of said first tine means are longer than said fingers of said second tine means.

3. The improvement of claim 1 further including:
   means adjacent said second tine means to vary the size of the restricted opening in the chute.

4. The improvement of claim 3, wherein said size varying means includes:
   a member in the chute pivoted toward and away from said second tine means to vary the size of the restricted opening in the chute, said pivotal member cooperating with said second tine means to hold the insulating material against the fingers of the second tine means so that the fingers can pull the isulating material from the chute into the pocket feeder.

5. The improvement of claim 4, wherein said size varying means includes:
   a slidable control means movable back and forth in engagement with said pivotal member to move said pivotal member toward and away from said second tine means; and
   means for securing said control means in selected fixed positions.

6. The improvement of claim 5, wherein said slidable control means has a series of spaced holes therein along the direction of movement and said securing means includes:
   a stationary support on the chute for slidably supporting said control means, said support having at least one aperture therein; and
   a removable pin extendable through any one of the spaced holes in said slidable control means for engagement with said aperture in said stationary support to hold said slidable control means in a selected fixed position on said stationary support to position said pivotal member.

7. The improvement as claimed in claim 1, further including:
   a first pressure relief passage in the rotory feeder between the connection to the source of pneumatic pressure and the restricted opening in the chute;
   a second relief passage in the chute; and
   a conduit interconnecting said first and second relief passages to vent any build up in pressure between the vanes to the chute to minimize any disturbance of the insulating material in the chute due to change in air pressure as the vanes pass the restricted opening.

8. The improvement of claim 1 wherein:
   the rod members have support means which include a plurality of opposing pairs of holes in the wall of the chute, the holes in each pair being in different horizontal planes and each of said rod members being slidably receivable in a pair of holes and supported thereby in an operating position inclined to the horizontal.

9. The improvement of claim 8 further including:
   guide means for guiding said rod members into said holes.

* * * * *